United States Patent [19]
Tsunoda et al.

[11] Patent Number: 4,770,363
[45] Date of Patent: Sep. 13, 1988

[54] BEARING MECHANISM FOR A SPINNING REEL FOR FISHING

[75] Inventors: Kikuo Tsunoda; Haruo Morita, both of Hiroshima, Japan

[73] Assignee: Ryobi Ltd., Hiroshima, Japan

[21] Appl. No.: 76,000

[22] Filed: Jul. 21, 1987

[30] Foreign Application Priority Data

Jul. 21, 1986 [JP] Japan .................. 61-112481[U]

[51] Int. Cl.⁴ .................................. A01K 89/01
[52] U.S. Cl. .................. 242/84.2 R; 242/84.21 R
[58] Field of Search ............. 242/84.2 R, 84.2 A, 242/84.2 B, 84.2 C, 84.2 D, 84.2 E, 84.2 F, 84.2 G, 84.2 H, 84.2 J, 84.4, 158, 84.5 R, 84.5 A, 84.5 P

[56] References Cited

U.S. PATENT DOCUMENTS

| 3,144,317 | 8/1964 | Wood | 242/84.5 A X |
| 4,389,027 | 6/1983 | Sazaki et al. | 242/84.2 G |
| 4,480,803 | 11/1984 | Sazaki | 242/84.2 G |
| 4,529,142 | 7/1985 | Yoshikawa | 242/84.5 A |

FOREIGN PATENT DOCUMENTS

| 2806826 | 8/1978 | Fed. Rep. of Germany | 242/84.2 G |
| 3047379 | 12/1981 | Fed. Rep. of Germany | 242/84.2 R |
| 60-26626 | 8/1985 | Japan . | |
| 62-80567 | 5/1987 | Japan . | |

Primary Examiner—Stanley N. Gilreath
Assistant Examiner—Joseph J. Hail, III
Attorney, Agent, or Firm—Finnegan, Henderson Farabow, Garrett & Dunner

[57] ABSTRACT

In a bearing mechanism, ball bearings are coaxially fitted in the front wall and the flanged holder portions of the body. The flanged holder is made hollow. The tubulr pinion shaft is inserted axially through the ball bearings such that it is supported at both ends. The spool shaft is supported movably back and forth in the tubular pinion shaft. Since the pinion shaft is supported at both ends, fishline can be lighty wound even if heavy loads act on the line.

3 Claims, 2 Drawing Sheets 4,770,363

BEARING MECHANISM FOR A SPINNING REEL FOR FISHING

FIELD OF THE INVENTION

The present invention relates to a bearing mechanism for a spinning reel for fishing, and particularly relates to a bearing mechanism in which a tubular pinion shaft is coupled to a master gear capable of being rotated by a handle shaft and supports a rotor rotatably to the body of a spinning reel and in which a spool shaft supported movably back and forth, is rotatably supported to the body of the spinning reel.

BACKGROUND OF THE INVENTION

In a conventional bearing mechanism, a pinion shaft is rotatably supported by a single ball bearing in the front wall of the body of a spinning reel.

In another conventional bearing mechanism, a pinion shaft (a) is supported by the front wall (b') of the body (b) of a spinning reel and a projecting portion in the reel body (b) as shown in FIG. 3.

The former conventional bearing mechanism has a problem that resistance to the fishline winding action of a handle becomes very high when heavy loads act on the fishline.

In the latter conventional bearing mechanism, the front portion of the pinion shaft (a) is supported by a ball bearing (d), but the rear portion of the pinion shaft cannot be supported by another ball bearing because of the spatial interference of a master gear (e) with the ball bearing and is therefore supported by a bearing member (f) made of metal, synthetic resin. For that reason, the bearing mechanism has a problem that when heavy loads act on the fishline at the time of winding thereof, the resistance to the pinion shaft (a) is heavily increased making it necessary to augment the fishline winding torque of the handle

SUMMARY OF THE INVENTION

An object of the present invention is to reduce the resistance to winding of a fishline in a fishing net when the line is under a heavy load.

Another object of the present invention is an improved bearing mechanism for a spinning reel for fishing.

These and other objects are accomplished by a bearing mechanism for a spinning reel having a body with a central axis supporting components of the reel in an operative arrangement including a master gear mounted in the body, a handle shaft rotatably supporting the master gear, the bearing mechanism comprising a front wall disposed on the body having a first central opening coaxial with the axis of the body, a flanged holder attached to the front wall exterior of the body and having a central portion spaced axially from the first central opening of the front wall, the central portion having a second opening coaxial with the first opening of the front wall, first ball bearing means disposed in the first central opening, second ball bearing means disposed in the second central opening, a pinion shaft having an axial bore therethrough having a pinion gear at one end, rotatably mounted in the first and second ball bearing means, the pinion gear disposed in meshed engagement with the master gear, a winding rotor fixedly attached to and rotatable with the pinion gear shaft, adjacent the central portion of the flanged holder and, a spool shaft reciprocally mounted in the axial bore of the pinion shaft.

DETAILED DESCRIPTION OF PREFERRED EMBODIMENT

The bearing mechanism of the present invention comprises a master gear rotatably supported to the body of the reel by a handle, a tubular pinion shaft coupled to the master gear through engagement which supports a rotor rotatably to the body of the reel, and a spool shaft supported movably back and forth in the tubular pinion shaft which supports a spool. A front wall formed from a first outside surface and a second inward surface, is provided on the front end of the body of the spinning reel. A flanged holder made hollow is secured to the outside surface of the front wall by screws. Ball bearings are coaxially fitted in the front wall and the flanged holder. The tubular pinion shaft is inserted axially through the ball bearings so that the tubular pinion shaft is supported at the front and rear portions thereof. This results in solving the above-mentioned problems.

Since the hollow flanged holder is secured to the front wall so that the mounting space for the ball bearings is not adversely affected by the master gear and other members, the ball bearings can be fitted in the front wall and the flanged holder to support the tubular pinion shaft at both the front and rear portions thereof. As a result, a fishline can be lightly wound even if heavy loads act on the fishline. Also, the distance between the front and rear portions of the tubular pinion shaft which are supported by the ball bearings can be made large enough to render the eccentricity of a pinion so minute as to enable the coaxial operation of the rotor and the spool.

Since the distance between the front and rear portions of the tubular pinion shaft is long due to the implementation of the flanged holder, the deviation of the axis of gyration of the tubular pinion shaft is extremely small preventing eccentric rotation of the rotor and the spool.

Figure 1:
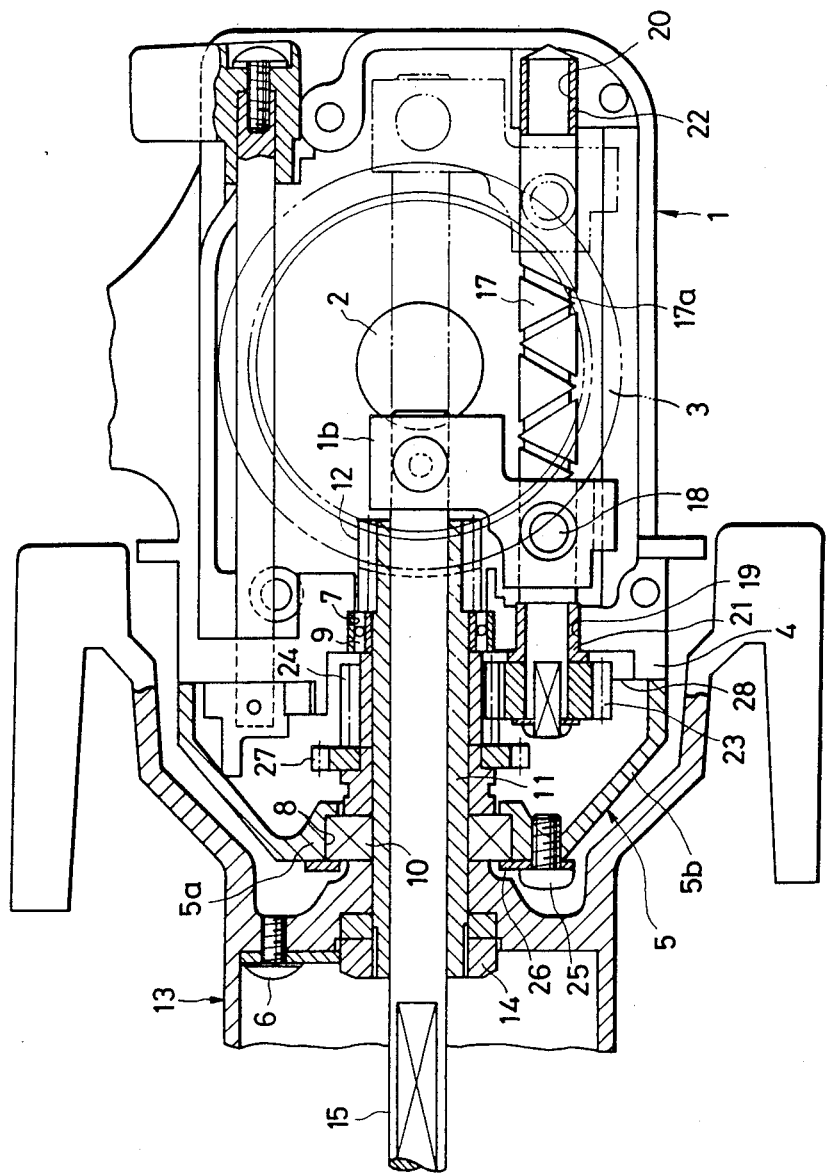
FIG. 1 shows a longitudinally sectional view of an embodiment a bearing mechanism for a spinning reel according to the present invention.
Figure 2:
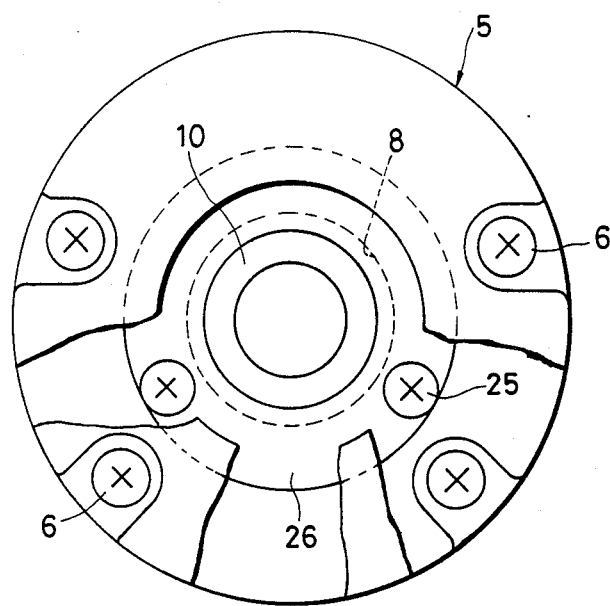
FIG. 2 shows a partially cutaway view of the body of a flanged holder secured to the front end of the body of the spinning reel.
Figure 3:
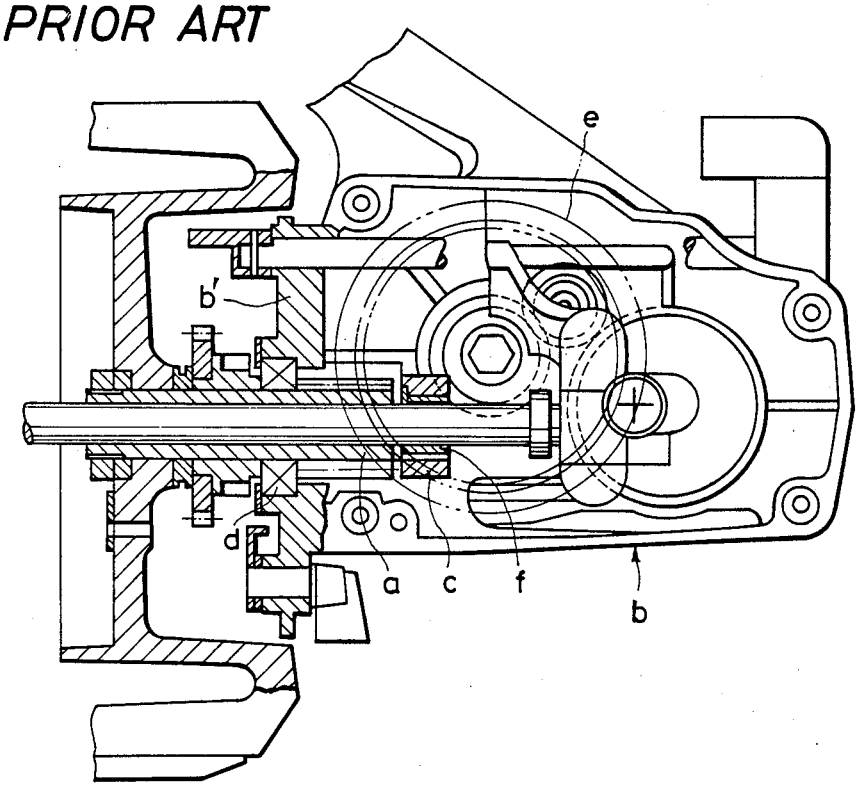
FIG. 3 shows a longitudinally sectional view of a conventional bearing mechanism for a spinning reel.

As shown in FIGS. 1 and 2, a master gear 3 is rotatably supported by a handle shaft 2 to the body 1 of a spinning reel. A front wall 4 is integrally provided on the front end of the body 1 of the spinning reel. A flanged holder 5 hollowly made of a front wall 5a and a peripheral portion 5b and having a rear opening shaped to correspond to the front surface 28 of the reel body 1 is secured to the outside surface of the front wall 4 of the reel body 1 by a securing means such as screws 6.

Bearing fitting holes 7 and 8 are coaxially provided in the front wall 4 of the reel body 1 and the front wall 5a of the flanged holder 5. Ball bearings 9 and 10 are fitted in the bearing fitting holes 7 and 8. A pinion shaft 11 is inserted through the ball bearings 9 and 10 and rotatably supported thereby.

A pinion 12 is provided at the rear end of the pinion shaft 11 extending into the reel body 1 and is engaged with the master gear 3. A rotor 13 is secured by a nut 14 to the front end of the pinion shaft 11 extending forward from the front wall 5a of the flanged holder 5, so that the rotor is turned by the rotation of a handle not shown in the drawings.

A spool shaft 15 supporting a spool (not shown in the drawings) at the front end of the spool shaft is supported in the pinion shaft 11. A reciprocator 16 is secured to the rear end portion of the spool shaft 15, which projects out of the pinion shaft 11 into the reel body 1. The reciprocator 16 is provided at a reciprocating cam shaft 17. A pin 18 provided on the reciprocator 16 is slidably fitted in the circumferential reciprocating cam groove 17a of the reciprocating cam shaft 17.

The reciprocating cam shaft 17 is supported by bearing members 21 and 22 fitted in shaft holes 19 and 20 provided in the front wall 4 and rear wall of the reel body 1. A reciprocating gear 23 is provided on the front end portion of the reciprocating cam shaft 17, which extends forward from the front wall 4 of the reel body 1. The reciprocating gear 23 is engaged with a reciprocating pinion 24 secured to the pinion shaft 11. As a result, when the pinion shaft 11 is rotated by the handle, the reciprocating cam shaft 17 is turned to move the reciprocator 16 back and forth together with the spool shaft 15 to reciprocate the spool (not shown in the drawings) backward and forward.

The ball bearing 9 is secured in the fitting hole 7 of the front wall 4 of the reel body 1.

The other ball bearing 10 is secured in the fitting hole 8 of the flanged holder 5 by a holding plate 26 secured to the front wall 5a of the flanged holder by screws 25.

Shown at 27 in FIG. 1 is an anti-reversing ratchet located between ball bearings 9 and 10 for selectively preventing reverse rotation of the spool shaft. The location of the ratchet between the ball bearings 9 and 10 enables shortening of the spool shaft in the axial direction so as to lessen the weight and size of the reel.

What is claimed is:

1. A bearing mechanism for a spinning reel having a body with an exterior front wall and a central axis supporting components of the reel in an operative arrangement including a master gear centrally mounted in the body, a handle shaft rotatably supporting the master gear, the bearing mechanism comprising:
    a flanged holder having a front wall formed from a first outside surface and a second inward surface disposed on the exterior front wall of the body, said first outside surface having a first central opening therein which is coaxial with the central axis of the body, further said second inward surface having a second central opening coaxial with said first central opening wherein the diameter of said second central opening is smaller than the diameter of said first central opening;
    first ball bearing means disposed in said first central opening;
    second ball bearing means disposed in said second central opening;
    a pinion shaft having an axial bore therethrough having a pinion gear at one end, rotatably mounted in said first and second ball bearing means, said pinion gear disposed in meshed engagement with said master gear;
    a winding rotor fixedly attached to and rotatable with said pinion gear shaft, adjacent the first central opening of the flanged holder;
    a spool shaft reciprocally mounted in said axial bore of said pinion shaft for forward and reverse rotation; and
    a ratchet provided between said first and second ball bearing means and coaxially mounted on said spool shaft for selectively preventing reverse rotation of said spool shaft;

2. A bearing mechanism according to claim 1 further comprising:
    an annular plate coaxially attached to said flanged holder and disposed between said flanged holder and said rotor for mounting said first bearing means in position in said flanged holder.

3. A bearing mechanism according to claim 1, wherein the flanged holder is a cup shaped hollow member.

* * * * *